United States Patent
Kim et al.

(10) Patent No.: US 12,308,892 B2
(45) Date of Patent: May 20, 2025

(54) METHODS AND SYSTEMS FOR LOCATION-BASED AUDIO MESSAGING

(71) Applicant: Verizon Patent and Licensing Inc., Basking Ridge, NJ (US)

(72) Inventors: Minkyung Kim, Berkeley Heights, NJ (US); Harry J. Laplanche, Gloucester, MA (US); Mark Weinberger, New York, NY (US); Anthony Gil Aguila, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 222 days.

(21) Appl. No.: 17/409,497

(22) Filed: Aug. 23, 2021

(65) Prior Publication Data

US 2023/0054838 A1 Feb. 23, 2023

(51) Int. Cl.
*H04B 11/00* (2006.01)
*H04W 4/029* (2018.01)

(52) U.S. Cl.
CPC ............ *H04B 11/00* (2013.01); *H04W 4/029* (2018.02)

(58) Field of Classification Search
None
See application file for complete search history.

(56) References Cited

U.S. PATENT DOCUMENTS

| | | | | |
|---|---|---|---|---|
| 5,208,848 A * | 5/1993 | Pula | ........................ | H04M 3/54 379/244 |
| 6,167,255 A * | 12/2000 | Kennedy, III | ........ | H04W 8/183 455/445 |
| 8,866,606 B1 * | 10/2014 | Will | ...................... | G08B 25/005 455/418 |
| 10,354,145 B2 * | 7/2019 | Nguyen | ................ | G06V 40/23 |
| 2003/0046401 A1 * | 3/2003 | Abbott | .................... | G06F 9/451 709/227 |
| 2003/0197612 A1 * | 10/2003 | Tanaka | ............... | G08B 13/2462 340/8.1 |
| 2004/0164896 A1 * | 8/2004 | Evans | ..................... | G01S 19/16 342/357.31 |
| 2005/0009536 A1 * | 1/2005 | Ito | ...................... | G08B 21/0297 455/414.1 |
| 2006/0089160 A1 * | 4/2006 | Othmer | ................... | H04W 4/23 455/457 |
| 2008/0310850 A1 * | 12/2008 | Pederson | ......... | G08B 13/19671 398/135 |
| 2008/0315994 A1 * | 12/2008 | Maltseff | ................ | G01S 13/765 340/10.1 |
| 2009/0054098 A1 * | 2/2009 | Jorgensen | ............. | H04M 15/00 455/519 |
| 2009/0089100 A1 * | 4/2009 | Nenov | .................... | G10L 15/22 704/235 |

(Continued)

*Primary Examiner* — Isam A Alsomiri
*Assistant Examiner* — Jonathan D Armstrong (57) ABSTRACT

An exemplary method includes a computing system receiving an audio message generated by a first device, determining a physical location of the first device when the audio message is generated, and associating the audio message with the physical location. The method further includes the computing system identifying a target recipient of the audio message, identifying a second device associated with the target recipient, and providing, based on a proximity of the second device to the physical location, the audio message to the second device.

19 Claims, 9 Drawing Sheets

(56) References Cited

U.S. PATENT DOCUMENTS

| | | | |
|---|---|---|---|
| 2009/0184823 A1* | 7/2009 | Tessier | G01S 5/02521 340/568.1 |
| 2011/0098056 A1* | 4/2011 | Rhoads | G06F 3/023 345/173 |
| 2012/0046044 A1* | 2/2012 | Jamtgaard | G01S 5/02585 455/456.1 |
| 2017/0060540 A1* | 3/2017 | Allen | G06F 8/36 |
| 2017/0256149 A1* | 9/2017 | Carey | G08B 13/246 |
| 2017/0308757 A1* | 10/2017 | Nguyen | G06V 40/23 |
| 2018/0183650 A1* | 6/2018 | Zhang | H04W 72/21 |
| 2019/0286373 A1* | 9/2019 | Karumbunathan | G06F 3/065 |
| 2019/0327124 A1* | 10/2019 | Lai | G01S 5/017 |
| 2019/0347783 A1* | 11/2019 | Salgian | G02B 27/017 |
| 2020/0073401 A1* | 3/2020 | Szatmary | G01S 17/931 |
| 2021/0006933 A1* | 1/2021 | Dean | G16Y 40/10 |
| 2022/0254509 A1* | 8/2022 | Sheriff | G16H 10/60 |
| 2023/0014580 A1* | 1/2023 | Zhu | G01C 21/206 |

* cited by examiner

METHODS AND SYSTEMS FOR LOCATION-BASED AUDIO MESSAGING

BACKGROUND INFORMATION

Modern communication technologies allow people to use devices to communicate with one another via communication networks. While existing communication technologies provide many benefits, there remains room to improve communication technologies, including by developing new communication technologies and/or enhancing existing communication technologies for effective use in particular contexts or environments.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Systems and methods for location-based audio messaging are described herein. In certain examples, an illustrative system may receive an audio message generated by a first device and determine a physical location of the first device when the audio message is generated. The system may associate the audio message with the physical location. The system may identify a target recipient of the audio message, along with a second device associated with the target recipient. The system may selectively provide the audio message to the second device based on one or more factors, such as by selectively providing the audio message to the second device based at least in part on a proximity of the second device to the physical location.

For example, in an industrial setting such as a factory floor, operatives may be provided network-enabled devices (e.g., thin-client devices) that may generate (e.g., capture) and provide audio. Operatives may provide audio messages that are captured by the devices. For a provided audio message, a physical location at which the audio message is captured may be determined and associated with the audio message (e.g., the audio message may be tagged with data representing the physical location). Further, a target recipient of the audio message may be determined, such as by using natural language processing to parse the content of the audio message. For example, an operative may indicate in the audio message that a janitor is needed to clean up a particular location of the factory floor. When a janitor is near the physical location associated with the audio message, the janitor may be provided the audio message on a device associated with the janitor. Using multi-access edge computing ("MEC") and/or other corresponding technologies (e.g., 5G network technologies, Wi-Fi 6 network technologies, etc.), such location-based audio messaging may be performed at very precise scales. This example as well as additional examples of location-based audio messaging are described in detail herein.

Systems and methods described herein provide one or more benefits and/or advantages over conventional communication technologies. As an example, systems and methods described herein may allow for efficient utilization and allocation of resources, such as resources associated with a factory floor, another industrial setting, or another specific environment. In a factory floor environment, for example, operatives located on the factory floor may speak audio messages that may be parsed and processed to determine resources needed in very specific locations. The indicated resources, such as one or more operatives on the factory floor, may be specifically and selectively targeted with the audio messages, allowing others who are not associated with the audio messages to remain undistracted. The specifically targeted operatives may also be targeted based on proximity to the physical location, maximizing efficiency for both the operative targeted and those who are located farther away from the physical location (e.g., by allowing those who are farther way to remain undistracted).

Various embodiments will now be described in more detail with reference to the figures. The disclosed systems and methods may provide one or more of the benefits mentioned above and/or various additional and/or alternative benefits that will be made apparent herein.

Figure 1:
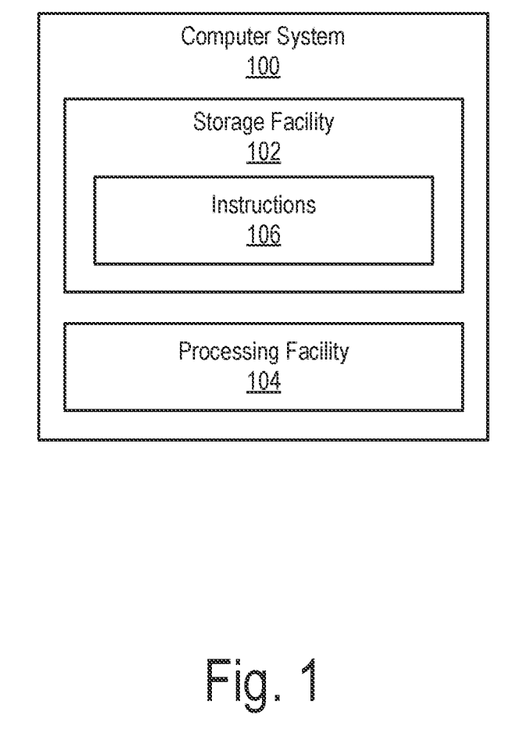
FIG. 1 illustrates an exemplary computer system for location-based audio messaging according to principles described herein.

FIG. 1 illustrates an exemplary computer system 100 ("system 100") for location-based audio messaging. System 100 may be implemented by any suitable computer system connected to a network, such as a MEC server that is integrated within a provider network and that employs MEC technology, 5G network technologies, a local network server, and/or other suitable technologies or combination of technologies that may enable system 100 to perform the operations described herein. In certain examples, system 100 may be implemented together with other systems, devices, and/or sensors (e.g., an image capture device, a monitoring device, etc.) within an environment that is configured to operate as a single, independent system. In other examples, system 100 may be implemented separately and may operate independently from other systems, devices, and/or sensors.

As shown, system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices and/or multiple locations as may serve a particular implementation. For example, facilities 102 and 104 may be spread across multiple processors or other distinct computing resources within a local server, a MEC server, and/or any other suitable computing system which, as will be described below, may incorporate a plurality of various servers or other resources. Each of facilities 102 and 104 within system 100 will now be described in more detail.

Storage facility 102 may maintain (e.g., store) executable data used by processing facility 104 to perform any of the functionality described herein. For example, storage facility 102 may store instructions 106 that may be executed by processing facility 104. Instructions 106 may be executed by processing facility 104 to perform any of the functionality described herein, and may be implemented by any suitable application, software, code, and/or other executable data instance. Additionally, storage facility 102 may also maintain any other data accessed, managed, used, and/or transmitted by processing facility 104 in a particular implementation.

Processing facility 104 may be configured to perform (e.g., execute instructions 106 stored in storage facility 102 to perform) various functions associated with location-based audio messaging. Examples of such operations are described herein.

In some examples, system 100 may be configured to operate in real time so as to access and process the data described above (e.g., the audio message captured by the device, the physical location of the device, etc.) as quickly as the data is generated or otherwise becomes available. As used herein, operations may be performed in "real time" when they are performed immediately and without undue delay.

Figure 2:
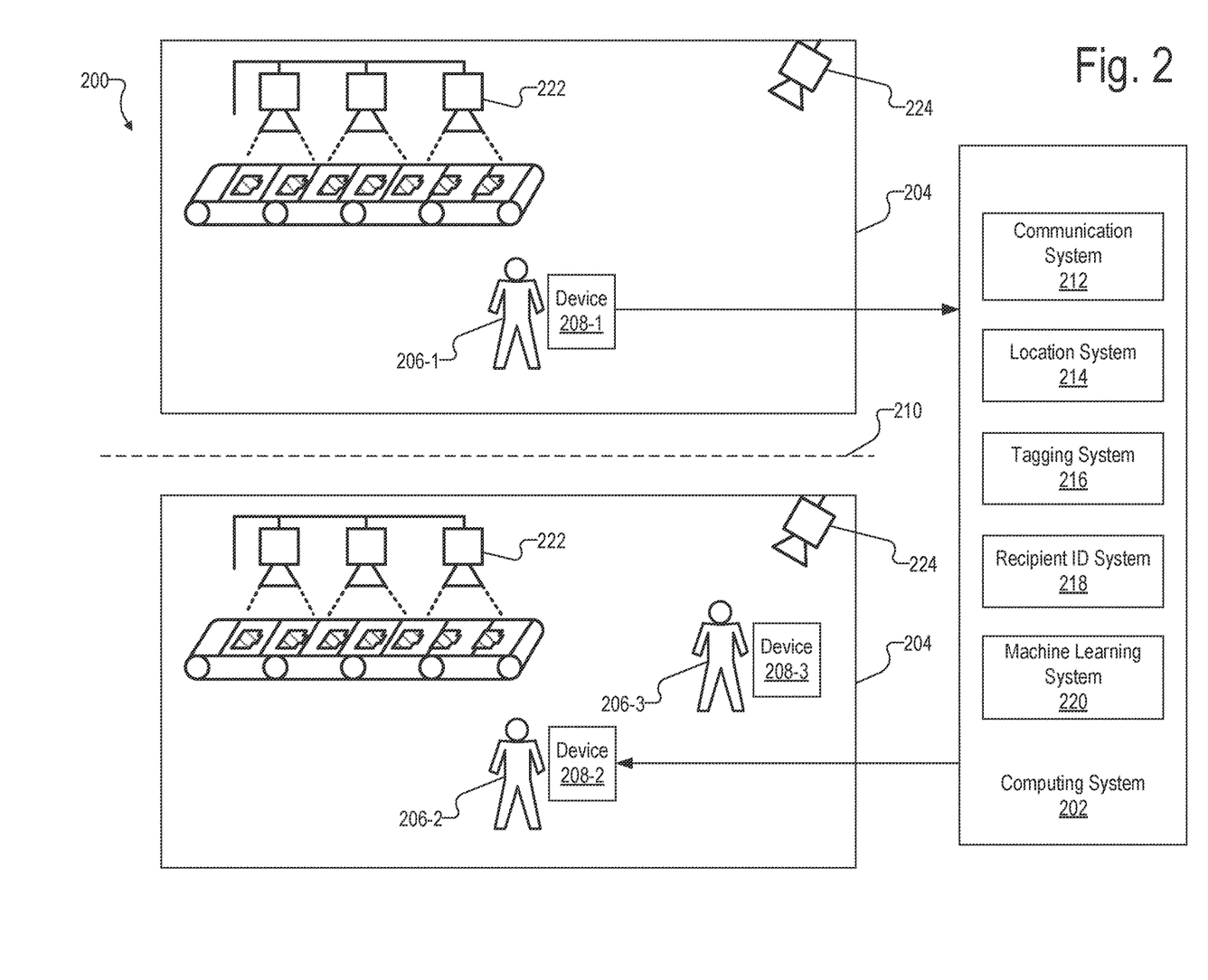
FIGS. 2-6 illustrate exemplary configurations of systems within which the computer system of FIG. 1 may operate to perform location-based audio messaging according to principles described herein.

System 100 may be configured to perform location-based audio messaging operations in various scenarios and contexts. For example, FIG. 2 shows an exemplary configuration 200 of a system within which a computing system 202 (e.g., an implementation of system 100) may operate to perform location-based audio messaging in an industrial environment. An industrial environment may include any environment that is associated with and/or related to any industrial process, such as manufacturing processes, warehousing processes, fulfillment processes, transportation processes (e.g., physical goods delivery processes), processes associated with providing services (e.g., processes associated with operating a content delivery network, a data center, etc.), and/or any other industrial process. For example, the industrial environment shown in configuration 200 is a factory floor 204. While certain examples described herein relate to audio messaging in an industrial environment, one or more principles described herein may apply to and be used in other environments such as office space environments, retail operation environments (e.g., a retail store), etc.

Configuration 200 shows computing system 202 configured to perform one or more location-based audio messaging operations in relation to a factory floor 204 and operatives 206 (e.g., operatives 206-1 through 206-3) located on the factory floor 204. In certain examples, operatives 206 may include any person in the industrial environment, such as workers, employees, visitors, etc. Each operative 206 has a respective device 208 (e.g., devices 208-1 through 208-3). Dashed line 210 represents a change in time, with the scene depicted above dashed line 210 showing a point in time before the scene depicted below dashed line 210 of a same factory floor 204. Devices 208 may communicate with computing system 202, which may include various subsystems. For instance, as shown, computing system 202 includes a communication system 212, a location system 214, a tagging system 216, a recipient identification (ID) system 218, and a machine learning system 220. These subsystems may be implemented in any suitable manner by computing system 202, such as on a same computing device, a plurality of computing devices, as separate systems or as components of one or more combined systems, etc.

Devices 208 may include any suitable devices capable of communicating over a network and providing and/or generating audio content. For example, devices 208 may include smartphones, tablets, laptops, smart watches, headsets, walkie-talkies, etc. In some examples, operatives 206 may be restricted from using devices such as smartphones in some industrial environments. Instead, the operatives may be provided devices 208 that may include headsets or walkie-talkies or other such devices that provide audio content to operatives 206. Such devices may further include microphones that allow the devices (e.g., headsets) to capture audio content such as audio messages and generate data and/or signals representative of the audio content. Devices 208 may each be implemented by a same type of device or a plurality of different types of devices.

Devices 208 may generate and/or transmit audio messages to computing system 202. Any suitable technologies may be used to generate, transmit, and receive audio messages. For instance, device 208-1 may generate an audio message by capturing the audio message from operative 206-1 who detects an issue with a machine 222 on factory floor 204 and generating data and/or a signal representative of the audio message. Operative 206-1 may record the audio message indicating the issue with machine 222 and a target recipient who may be qualified to deal with the issue. Additionally or alternatively, device 208 may generate the audio message by autonomously generating the content of the audio message and data and/or a signal representative of the audio message. For example, device 208 may use machine learning (e.g., machine vision algorithms, etc.) to determine the issue with machine 222, determine a target recipient, and/or generate the audio message including such content. Additionally or alternatively, machine 222 may autonomously generate the audio message indicating the issue with machine 222 and a target recipient of the audio message.

Computing system 202 (e.g., communication system 212) may receive the audio message generated by device 208-1. Communication system 212 may be implemented in any manner suitable for receiving and sending data representing audio messages. For example, communication system 212 may be implemented using technologies such as cellular network technologies, MEC server communication technologies, Wi-Fi technologies, etc. and/or any combination of such technologies so that computing system 202 may be able to operate with multiple the types of device 208 used for location-based audio messaging.

Computing system 202 (e.g., location system 214) may determine a physical location associated with the audio message, such as a physical location at which device 208-1 is located when device 208-1 generates the audio message. Location system 214 may determine the physical location in any suitable manner. For example, device 208-1 may transmit the audio message to computing system 202 and computing system 202 may receive and store (e.g., record) the audio message. Concurrently, location system 214 may determine the physical location of device 208-1 and thus determine the physical location of device 208-1 associated with the audio message (e.g., the physical location of device 208-1 when the audio message is being generated by device 208-1 or when the audio message is being received by computing system 202).

Additionally or alternatively, device 208-1 may determine its own physical location or be provided its physical location (e.g., by computing system 202, by a GPS system, etc.) and associate the physical location with the audio message in conjunction with device 208-1 generating the audio message. Device 208-1 may then transmit data representing the audio message and the associated physical location to computing system 202.

Additionally or alternatively, operative 206-1 may provide input on device 208-1 (e.g., on a map of factory floor 204) indicating a physical location to be associated with the audio message. The physical location provided by operative 206-1 may be the physical location of operative 206-1 (and device 208-1) while the audio message was being generated and/or a different location to be associated with the audio message.

Additionally or alternatively, computing system 202 may analyze the audio message to determine a physical location associated with the audio message. For example, operative 206-1 may indicate in the content of the audio message a physical location and/or an object with a known physical location (e.g., machine 222). Computing system 202 may analyze the audio message (or a portion of the audio message), such as by using natural language processing (e.g., any suitable natural language processing algorithm, machine learning system 220, etc.) to determine the physical location associated with the audio message based on the content of the audio message.

In some examples, the locations associated with audio messages may be determined on an extremely precise scale (e.g., centimeters, inches, 5-10 inch increments, etc.) using technologies such as 5G network technologies, MEC server technologies, Wi-Fi 6 on 60 GHz technologies, Wi-Fi triangulation, imaging sensors (e.g., video) and machine vision, real-time kinetics, etc. Such precision of locations associated with audio messages may facilitate use of location-based audio messaging in ways that improve industrial processes such as processes that may be performed on factory floor 204.

Computing system 202 (e.g., tagging system 216) may associate the audio message with the physical location. Tagging system 216 may associate the audio message with the physical location in any suitable manner. For example, tagging system 216 may add metadata representing the physical location to data representing the audio message. Additionally or alternatively, tagging system 216 may use a data structure that includes the data representing the audio message or data specifying the audio message (e.g., text of the audio message, a memory location of the audio message, etc.), with data indicating the physical location.

Computing system 202 (e.g., recipient ID system 218) may determine a target recipient of the audio message in any suitable manner. For instance, recipient ID system 218 may use natural language processing on the audio message (or a portion of the audio message) to determine the target recipient based on the content of the audio message. For example, operative 206-1 may identify in the audio message a specific person (e.g., by name, by an ID number, etc.), and recipient ID system 218 may process data representing the content of the audio message to identify the person indicated in the audio message. Additionally or alternatively, operative 206-1 may identify in the audio message a specific role, such as a maintenance worker, a delivery person, a janitor, a supervisor, etc., and recipient ID system 218 and/or machine learning system 220 may determine that the target recipient is any operative having the specified role. Additionally or alternatively, operative 206-1 may identify in the audio message a specific task, such as a cleanup needed, a repair, etc., and recipient ID system 218 and/or machine learning system 220 may determine that the target recipient is any operative qualified for the specified task. Recipient ID system 218 may determine operatives associated with specified roles and/or tasks based on a lookup table and/or in any other suitable way. Additionally or alternatively, for example, recipient ID system 218 may access (e.g., receive information from, request information from, communicate with, include, etc.) a human resources (HR) system and/or an enterprise resource planning (ERP) system associated with the industrial environment to access and use data from such system(s) to determine operatives associated with specified roles and/or tasks.

Additionally or alternatively, recipient ID system 218 may determine the target recipient of the audio message based on information provided with the audio message by device 208-1. For example, the audio message may include metadata that indicates a target recipient. Additionally or alternatively, device 208-1 may provide an interface (e.g., an app) for operative 206-1 to use to indicate a target recipient, which may then be provided to computing system 202 (e.g., as metadata or other data associated with the audio message).

Recipient ID system 218 may identify a device (e.g., device 208-2) associated with the target recipient in any suitable manner. For instance, device 208-2 may have a unique identifier (e.g., a MAC address, an ICCID number, etc.) that is associated with operative 206-2. Additionally or alternatively, operative 206-2 may have a unique identifier (e.g., a phone number, an email address, etc.) that is associated with device 208-2.

Additionally or alternatively, device 208-2 may belong to a pool of devices that are assigned to specific people or roles. For example, each janitor may be provided a device from an identifiable pool of janitor devices so that if an audio message requests a janitor at a physical location, computing system 202 may determine the locations of the janitor devices and/or determine, for each device that enters a proximity of the physical location, whether the device is in the janitor pool of devices.

Additionally or alternatively, recipient ID system 218 and/or machine learning system 220 may determine, for a same point in time, a physical location of an operative and a device and associate the device with the operative for a specified time period (e.g., a work day, a work shift, etc.). For example, an operative may be provided a device for the day and such information may be noted on provision of the device to the operative. Additionally or alternatively, an operative's identification may be verified at an access point (e.g., swipe or tap an ID at a locked door, etc.). Computing system 202 may receive the identification verification and determine the device located at the access point at the time of the identification verification and associate the device to the operative. Additionally or alternatively, factory floor 204 may include sensors (e.g., video camera(s) 224, microphones, sensors on robots or other machines, etc.) that may provide data that can be analyzed to identify an operative at a physical location (e.g., using machine vision, facial recognition, voice recognition, etc.). For any such identification, computing system 202 may determine a location of a device in the same physical location at the same time and associate any such device with the operative. Additionally or alternatively, computing system 202 may identify an operative using voice recognition based on an additional audio message provided by the operative using a device, including audio messages having target recipients and/or an audio message provided specifically for verification. Computing system 202 may then associate the operative with that device.

Computing system 202 may selectively provide the audio message to a device based on one or more factors. For instance, computing system 202 may provide the audio message based on the proximity of the device to the physical location associated with the audio message. Computing system 202 may provide the audio message based on the proximity in any suitable manner. For example, the proximity may be defined to include any distance that is within a predetermined distance (e.g., 5 feet, 10 feet, or any other suitable distance) of the physical location associated with the audio message. Additionally or alternatively, the proximity may be based on a task and/or role specified in the audio message. In certain examples, different roles or tasks may be associated with different defined proximities. For instance, an audio message indicating a cleanup needed may be provided to target recipients in a larger proximity than would be an audio message indicating a repair needed. Additionally or alternatively, the proximity may be based on a characteristic of the physical location. For example, an audio message associated with a physical location including many machines may be provided based on a closer proximity so that a specified machine may be more obvious. Additionally or alternatively, the proximity may be based on a priority and/or urgency of the audio message. For instance, an audio message indicating an emergency may be provided to a larger proximity than an audio message that is not associated with an emergency. Additionally or alternatively, the proximity may change, such as based on time. For example, the proximity may grow as time passes so that if an audio message is not provided and/or addressed for a predetermined amount of time the likelihood of the audio message being provided may grow as the proximity is increased. For example, if an audio message is not provided after a defined threshold amount of time, the proximity may be enlarged by a defined amount to cover a larger space. Additionally or alternatively, the proximity may be based on a geofence configured to trigger delivery of an audio message associated with the geofence. A geofence may have any suitable shape, such as a polygon, a user-defined shape, a room-defined shape, a shape defined by a physical space around a machine, etc. For instance, the geofence may be based on a shape of a room in which machine 222 is located, or a user may define any particular shape around machine 222 in which the audio message is to be provided. In certain examples, ingress into a space defined by a geofence may trigger delivery of an audio message, or may be used as one factor to determine whether and/or when to delivery the audio message to a device 208.

Computing system 202 may determine that a device is within a proximity of the physical location of the audio message in any suitable manner. For example, computing system 202 may track a physical location of each device 208 so that computing system 202 may detect that an appropriate device 208 is in a proximity of the physical location of the audio message where the appropriate device 208 is to be provided the audio message. Such tracking may be performed continuously, periodically, or in any other suitable manner using any suitable technology such as 5G network technologies, MEC server technologies, Wi-Fi 6 on 60 GHz technologies, Wi-Fi triangulation, imaging sensors (e.g., video) and machine vision, real-time kinetics, etc. For example, devices 208 may send and receive wireless signals to/from transceivers and computing system 202 may obtain and use information about the signals to determine and track positions of devices 208. As another example, computing system 202 may use data from imaging sensors to determine and track positions of devices 208.

Figure 3:
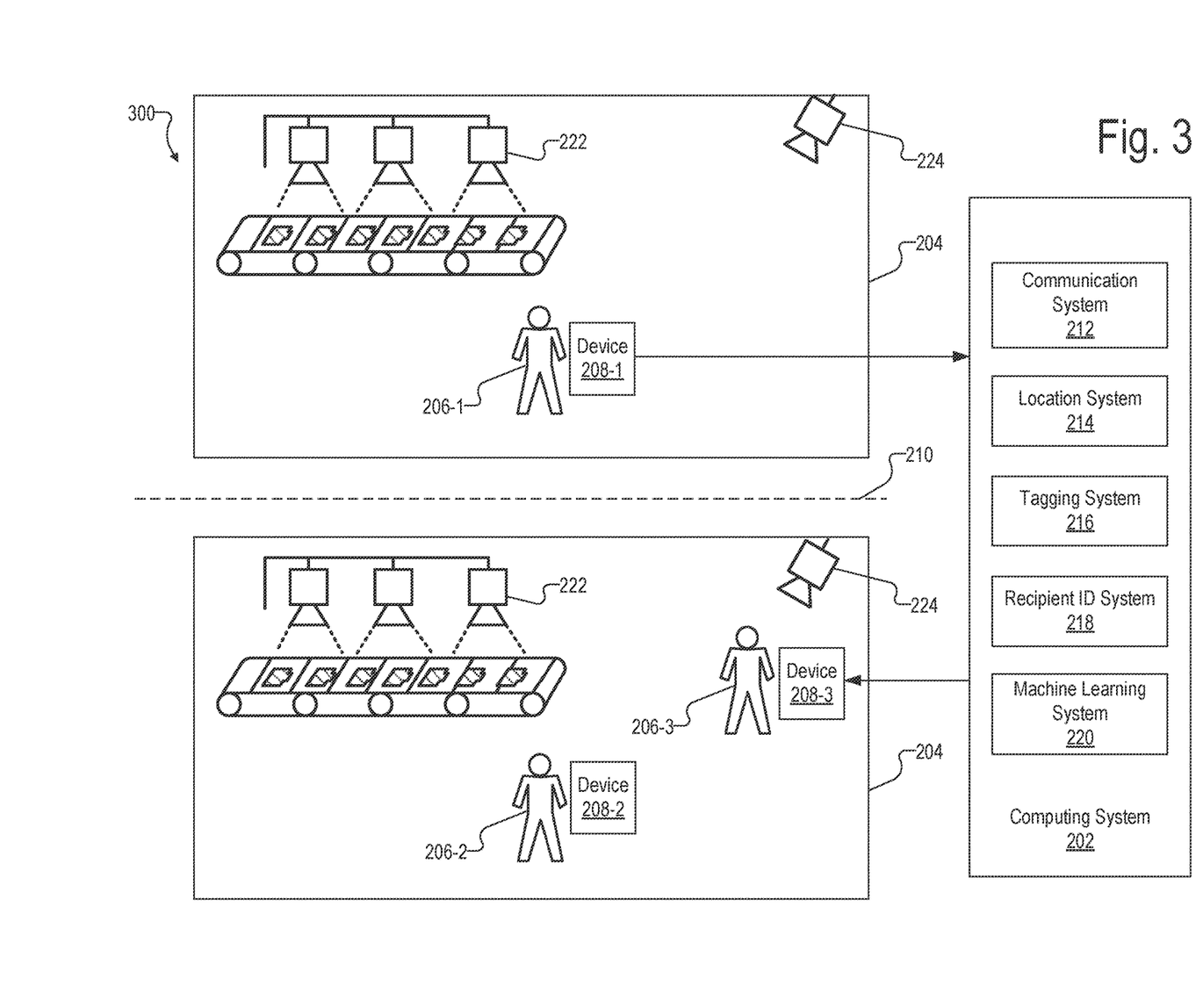

FIG. 3 shows another exemplary configuration 300 of a system within which computing system 202 may operate to perform location-based audio messaging on factory floor 204. In this example, operative 206-1 provides an audio message at a physical location near machine 222 indicating that machine 222 needs a repair. Computing system 202 may determine (e.g., using natural language processing on the content of the audio message) that the target recipient is any operative who is a maintenance worker qualified to repair machine 222. Computing system 202 may provide the audio message to the target recipient based on a proximity to the physical location by determining a closest device that is associated with a qualified maintenance worker. Thus, rather than wait for the target recipient to come within a predetermined distance from the physical location, computing system 202 may provide the audio message to a (or a plurality of) closest target recipient(s).

As shown, operative 206-2, while closer to the physical location, may not be a maintenance worker qualified to repair machine 222 and therefore computing system 202 abstains from providing the audio message to device 206-2 associated with operative 206-2. Rather, computing system 202 may provide the audio message to device 206-3, which may be associated with operative 206-3, who happens to be the closest maintenance worker qualified to repair machine 222.

In some examples, the audio message may further include a priority, such as operative 206-1 saying that the needed repair is an emergency. Computing system 202 may, based on the priority indicated with the audio message, provide the audio message to the closest device associated with a target recipient, rather than wait for the target recipient to be located proximate to the physical location.

Figure 4:
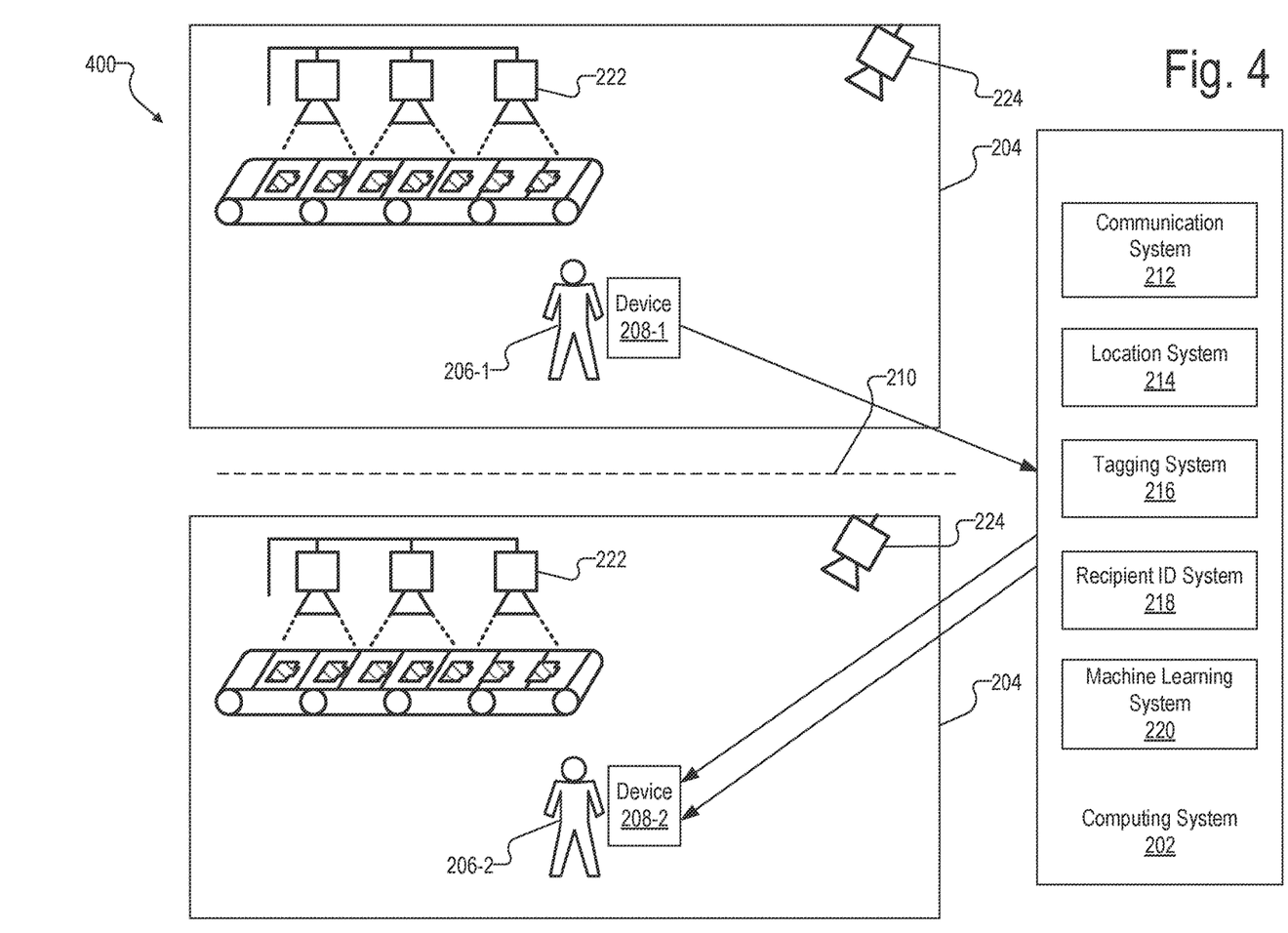

FIG. 4 shows another exemplary configuration 400 of a system within which computing system 202 may operation to perform location-based audio messaging on factory floor 204. Configuration 400 shows computing system 202 providing a plurality of audio messages to device 208-2. Computing system 202 may determine a priority of one or more of the audio messages relative to each other to provide to device 208-2 and selectively provide one or more of the audio messages to device 208-2 based on the priority.

For instance, operative 206-1 may record more than one audio message at the physical location near machine 222 intended for operative 206-2. Additionally or alternatively, other operatives may record one or more messages at the physical location. Additionally or alternatively, operative 206-2 may be determined to be the target recipient of multiple different audio messages based on proximity to the physical location and/or other physical locations (such as in configuration 300).

Computing system 202 may determine the priority of an audio message in any suitable manner. For example, the priority of an audio message may be based on a specifying of the target recipient. For instance, if an audio message specifies operative 206-2 specifically (e.g., by name and/or other identifier), such an audio message may be assigned a higher priority than an audio message that identifies operative 206-2 by role and/or task. Additionally or alternatively, an audio message may include a prioritization keyword that indicates the priority of the audio message. For instance, computing system 202 may apply natural language processing and/or other machine learning algorithms to the content of the audio message for words such as "emergency," "high priority," "low priority," "important," etc. Additionally or alternatively, the priority of an audio message may be based on a characteristic of an operative providing the audio message. For example, if the operative is a supervisor of the target recipient of the message, an audio message provided by such an operative may receive a higher priority than a default audio message.

Additionally or alternatively, the priority of an audio message may be changed by the target recipient or based on an action of the target recipient. For example, if the target recipient indicates that the audio message is received and/or resolved, the priority of the audio message may be lowered and/or the audio message may expire. Additionally or alternatively, the priority of an audio message may change based on time, such as increasing or decreasing in priority as time passes. Additionally or alternatively, an audio message may include an expiration, such as a particular date and/or time or after a particular time period.

Figure 5:
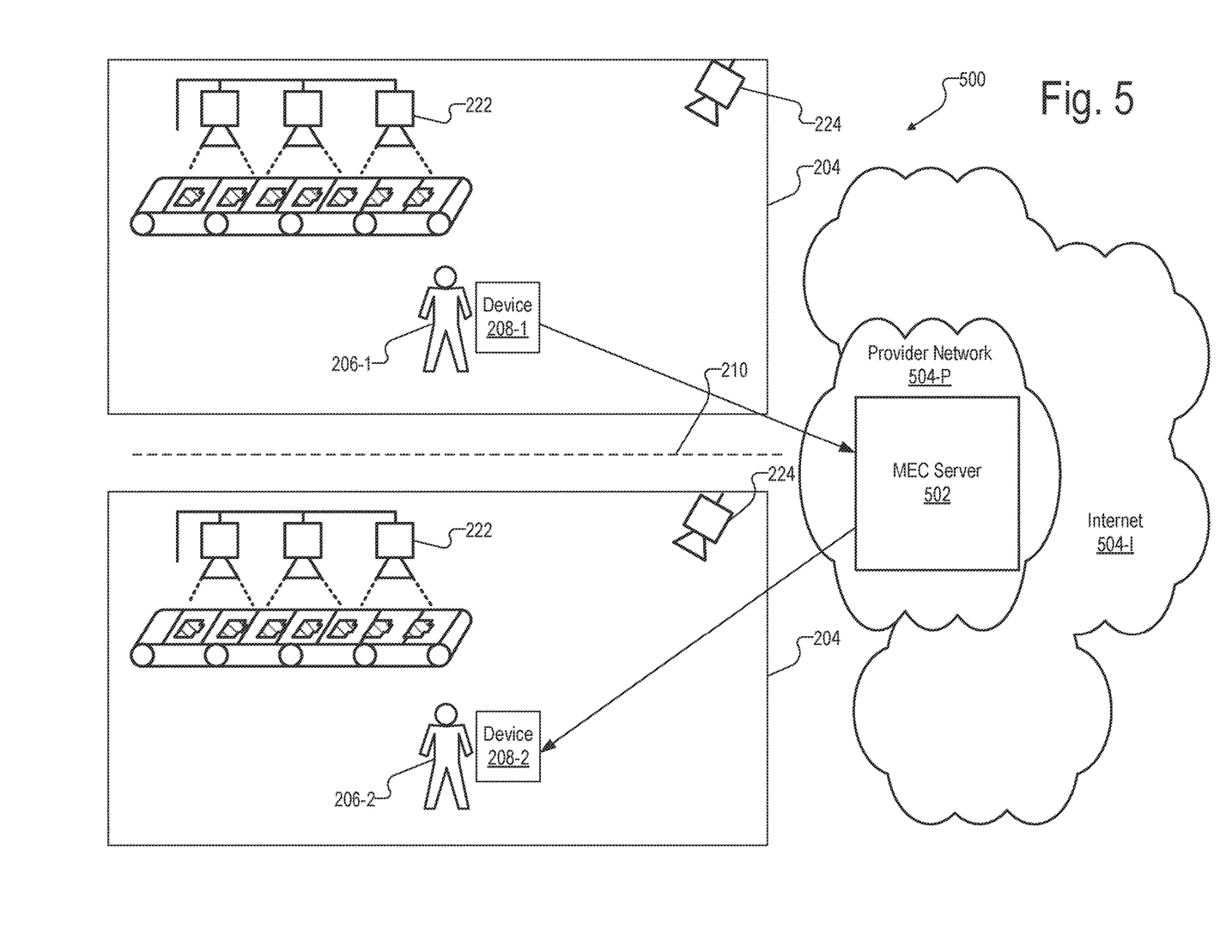

FIG. 5 shows another exemplary configuration 500 of a system in which computing system 202 is implemented using a MEC server 502 integrated within a network 504 (including a provider network 504-P portion and an Internet 504-I portion). Implementing computing system 202 with MEC server 502 may allow computing system 202 to perform resource-intensive computing tasks (e.g., communicating with a plurality of devices 208, determining physical locations of audio messages generated by devices 208, natural language processing of the audio messages, etc.) with a very low latency. Further, such an implementation may allow devices 208 to be implemented using thin-client devices and/or any other devices that are configured to capture audio and communicate with computing system 202, allowing computing system 202 to operate with multiple types of devices.

Figure 6:
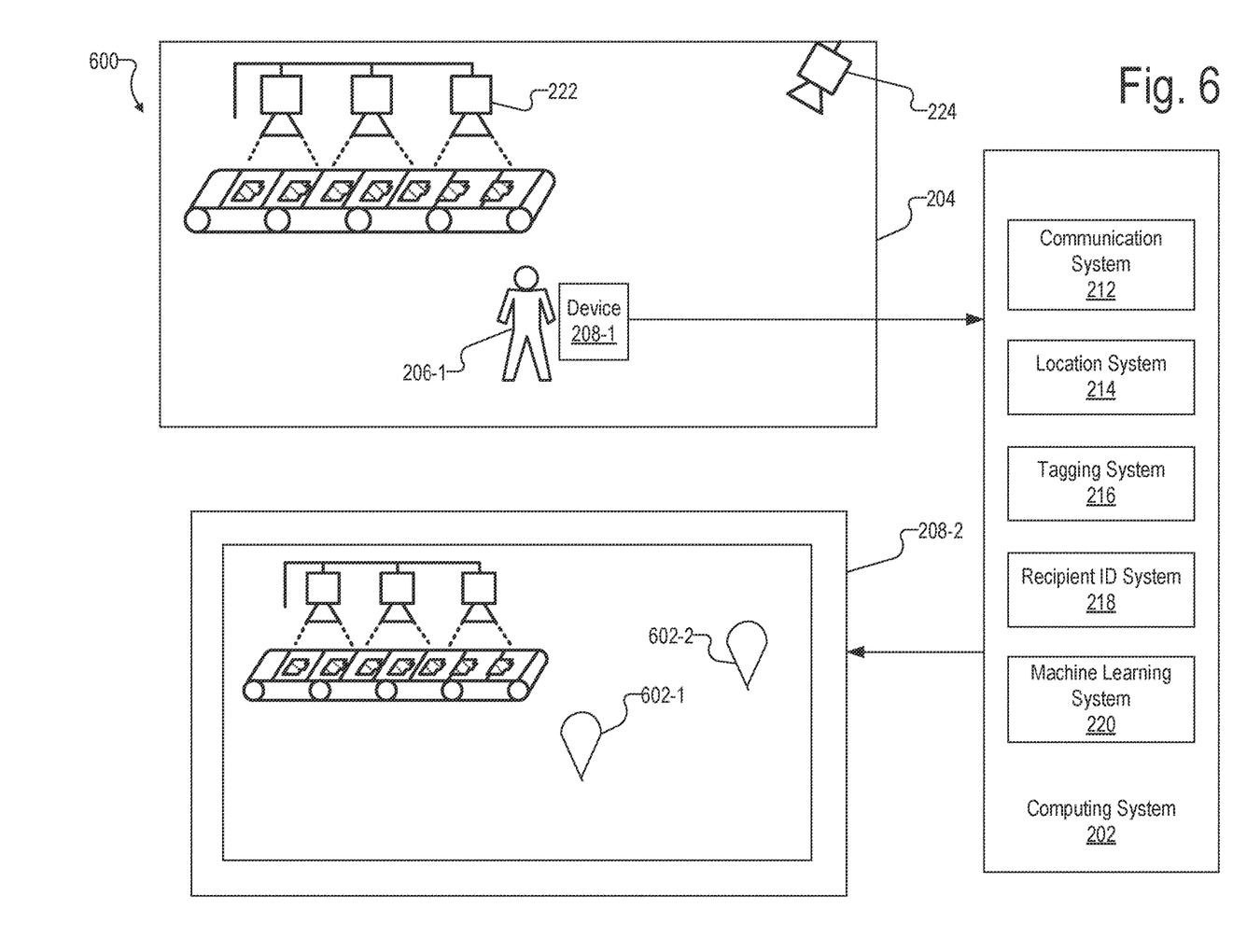

FIG. 6 shows another exemplary configuration 600 of a system in which computing system 202 may operate to perform location-based audio messaging on factory floor 204. In this example, as in configuration 200, operative 206-1 provides an audio message at a physical location near machine 222. Computing system 202 determines that operative 206-2 (not shown) is a target recipient of the audio message and provides information associated with the audio message to device 208-2 associated with operative 206-2.

For example, computing system 202 may provide the audio message, a visual representation of the audio message (e.g., a marker indicating a presence of the audio message), a visual representation of information extracted from content of the audio message (e.g., a transcription of the audio message, a task associated with the audio message, a physical location associated with the audio message, etc.), a visual representation of a physical location of the audio message, and/or a visual representation of any other such information associated with the audio message or any combination of such information.

For instance, in configuration 600, computing system 202 provides to device 208-2 a visual representation of the audio message. As shown, device 208-2 presents a visual representation of factory floor 204, and computing system 202 provides markers 602 (e.g., marker 602-1 and 602-2) for display that indicate the physical locations associated with audio messages for operative 206-2. For instance, marker 602-1 may indicate the physical location of the audio message provided by operative 206-1 regarding machine 222. Such markers 602 may be configured such that an operative may interact with (e.g., click on, hover over, etc.) markers 602 to receive further information associated with the audio message. For example, operative 206-2 may click on marker 602-1 to hear the audio message, to read a transcript of the audio message (or a portion of the audio message), to see text and/or an icon representing a task associated with the audio message (e.g., an icon showing a repair is needed, etc.), to receive information about a sender of the audio message, etc.

While configuration 600 shows markers 602, any suitable indicator and/or visual representation may be used, such as a link, an icon, a graphic, the information associated with the audio message, etc. Additionally or alternatively, while configuration 600 shows a visual representation of factory floor 204, any suitable visualization may be used, such as a list, an augmented reality (AR) environment that shows visual representations of audio messages superimposed on a scene captured by a camera of a device, etc.

Figure 7:
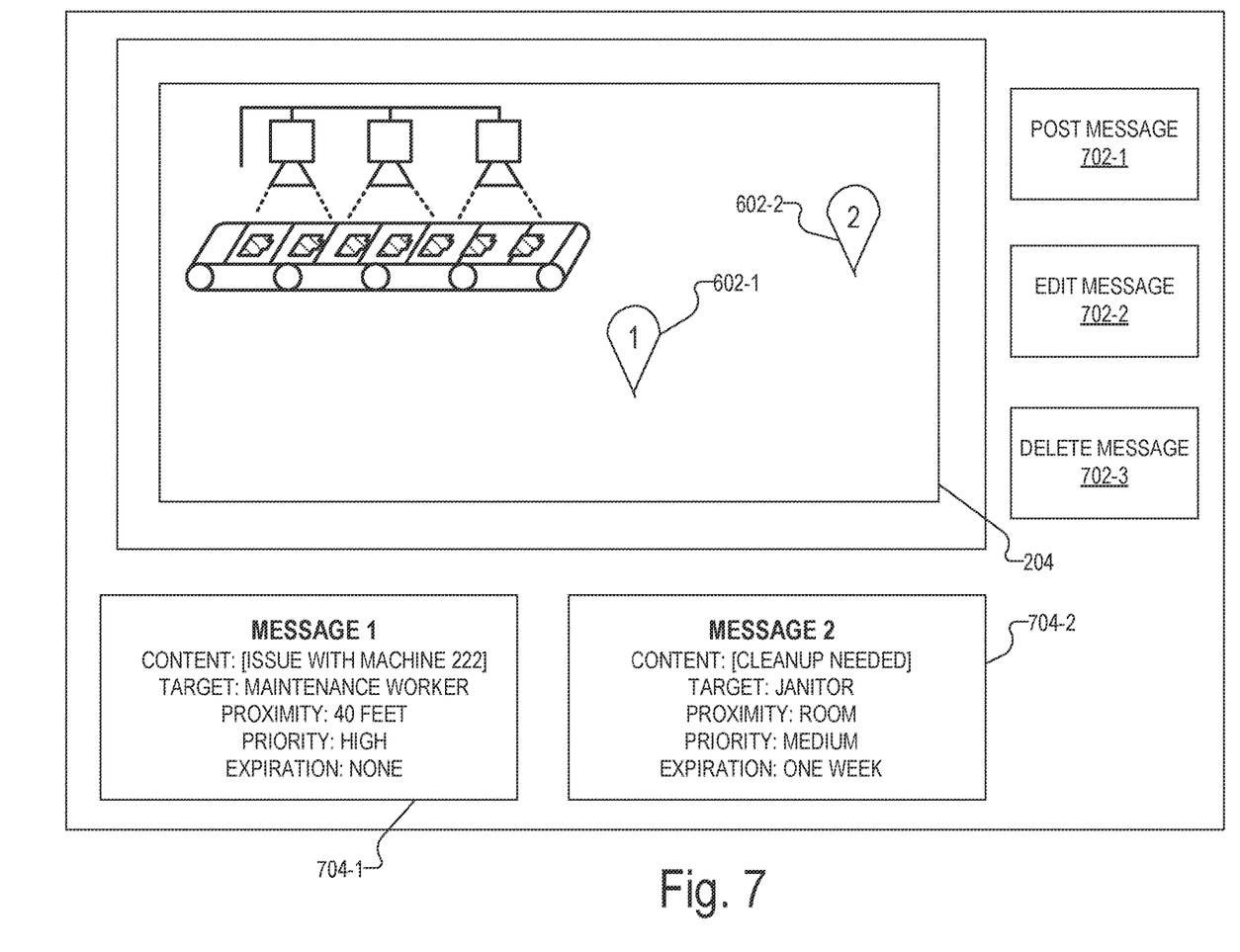
FIG. 7 illustrates an exemplary user interface according to principles described herein.

FIG. 7 illustrates an exemplary user interface (UI) 700 whereby a location-based audio messaging system (e.g., computing system 202) may be administered. UI 700 may include a visual representation of factory floor 204, with markers 602 indicating physical locations of audio messages on factory floor 204. UI 700 may further include buttons 702 (e.g., buttons 702-1 through 702-3, which may be implemented as icons, links, or any other suitable UI element) that a user may select to post a new audio message, edit an audio message, or delete an audio message.

UI 700 further includes UI elements 704 that may display information associated with each audio message, such as a content of the audio message, a target recipient, a proximity, a priority, an expiration, and any other suitable associated information. UI elements 704 may be interactive elements through which the user may manage audio messages, such as by editing and/or deleting the information associated with each audio message and/or the audio message itself.

Figure 8:
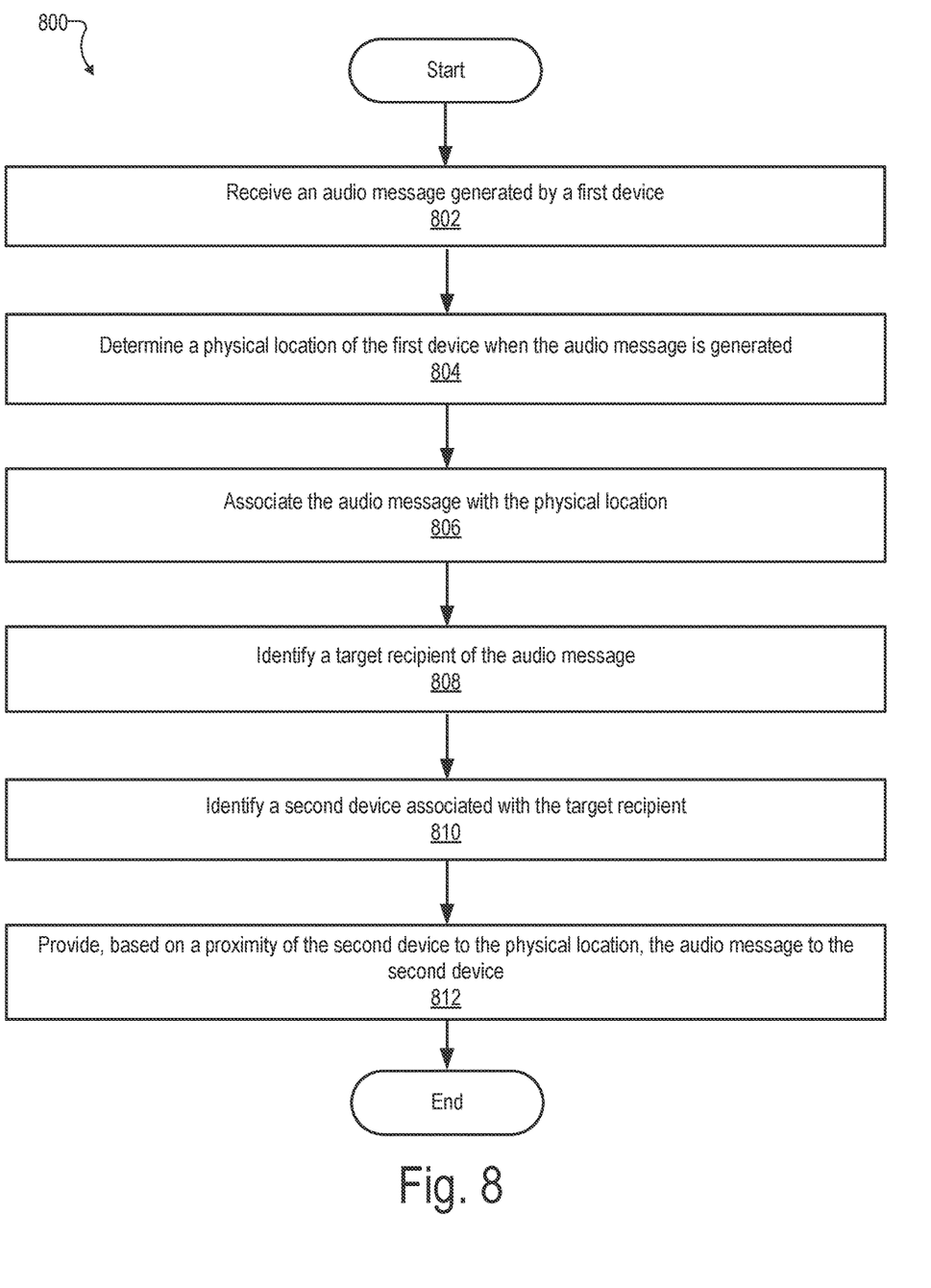
FIG. 8 illustrates an exemplary method for location-based audio messaging according to principles described herein.

FIG. 8 illustrates an exemplary method 800 for location-based audio messaging. While FIG. 8 illustrates exemplary operations according to one embodiment, other embodiments may omit, add to, reorder, and/or modify any of the operations shown in FIG. 8. One or more of the operations shown in FIG. 8 may be performed by system 100, any components included therein, and/or any implementation thereof.

In operation 802, a computing system receives an audio message generated by a first device. Operation 802 may be performed in any of the ways described herein.

In operation 804, the computing system determines a physical location of the first device when the audio message is generated. Operation 804 may be performed in any of the ways described herein.

In operation 806, the computing system associates the audio message with the physical location. Operation 806 may be performed in any of the ways described herein.

In operation 808, the computing system identifies a target recipient of the audio message. Operation 808 may be performed in any of the ways described herein.

In operation 810, the computing system identifies a second device associated with the target recipient. Operation 810 may be performed in any of the ways described herein.

In operation 812, the computing system provides, based on a proximity of the second device to the physical location, the audio message to the second device. Operation 812 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 9:
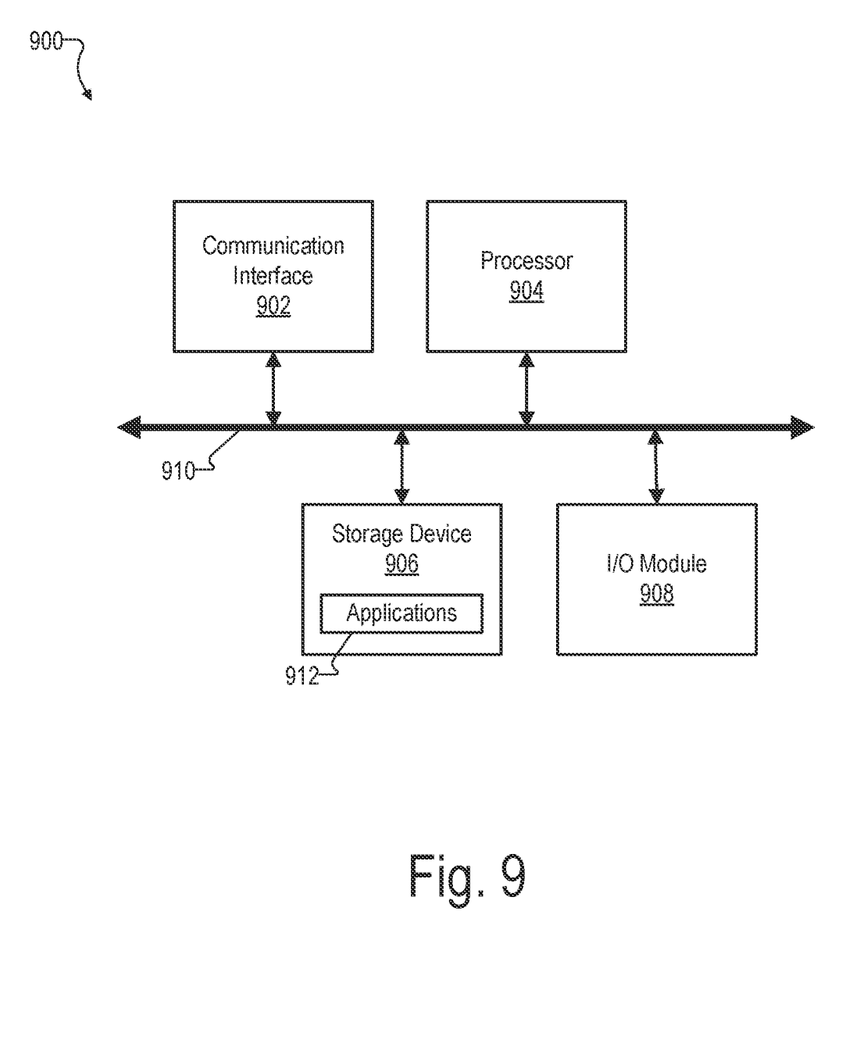
FIG. 9 illustrates an exemplary computing device according to principles described herein.

FIG. 9 illustrates an exemplary computing device 900 that may be specifically configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with processing facility 104 of system 100. Likewise, storage facility 102 of system 100 may be implemented by or within storage device 906.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by a computing system, an audio message generated by a first device;
   determining, by the computing system, a physical location associated with the audio message;
   identifying, by the computing system, a target recipient of the audio message;

identifying, by the computing system, a second device associated with the target recipient, the identifying the second device comprising:
  identifying a location of the target recipient at a particular time by receiving an identification verification of the target recipient at an access point at the location, and
  identifying a device at the location at the particular time as the second device;
providing, by the computing system and based on a proximity of the second device to the physical location, the audio message to the second device;
abstaining from providing, by the computing system, the audio message to a third device within the proximity to the physical location but not associated with the target recipient; and
determining, by the computing system, a priority of the audio message relative to an additional audio message that is associated with the physical location and the target recipient, wherein the providing the audio message to the second device is further based on the priority and the determining the priority comprises assigning the audio message with a higher priority than the additional audio message based on the target recipient of the audio message being indicated by an identifier specific to the target recipient and the target recipient of the additional audio message being indicated by a role of the target recipient.

2. The method of claim 1, wherein the identifying the target recipient comprises identifying, based on natural language processing of at least a portion of the audio message, at least one of:
  a specified person who is the target recipient,
  a specified role associated with the target recipient, or
  a specified task associated with the target recipient.

3. The method of claim 1, wherein the providing the audio message to the second device based on the proximity comprises providing the audio message to the second device based on determining that the second device is within a predetermined distance from the physical location.

4. The method of claim 1, wherein:
  the target recipient comprises any operative having a specified role; and
  the providing the audio message to the second device based on the proximity comprises determining that the second device is a closest device associated with the target recipient to the physical location.

5. The method of claim 1, further comprising:
  identifying, by the computing system and based on natural language processing of at least one of a portion of the audio message or a portion of the additional audio message, a prioritization keyword; and
  wherein the determining the priority comprises prioritizing, based on the prioritization keyword, the audio message and the additional audio message.

6. The method of claim 1, further comprising:
  identifying, by the computing system and based on natural language processing of at least a portion of the audio message and at least a portion of the additional audio message, a specified task in the audio message and an additional specified task in the additional audio message; and
  the determining the priority comprises prioritizing, based on the specified task and the additional specified task, the audio message and the additional audio message.

7. The method of claim 1, wherein the identifying the second device associated with the target recipient comprises:
  receiving, by the computing system from the second device, an additional audio message; and
  analyzing, by the computing system, the additional audio message to identify the target recipient.

8. The method of claim 1, wherein the determining the physical location associated with the audio message comprises:
  determining an additional physical location of the first device while the audio message is being generated utilizing at least one of a 5G network or a Wi-Fi 6 network implemented at the additional physical location; and
  associating the additional physical location with the physical location.

9. The method of claim 1, wherein the determining the physical location associated with the audio message comprises receiving input via the first device indicating the physical location.

10. The method of claim 1, wherein the identifier specific to the target recipient comprises an identifier unique to the target recipient.

11. A method comprising:
  receiving, by a computing system, an audio message generated by a first device;
  determining, by the computing system, a physical location associated with the audio message;
  identifying, by the computing system, a target recipient of the audio message;
  identifying, by the computing system, a second device associated with the target recipient, the identifying the second device comprising:
    identifying a location of the target recipient at a particular time by receiving an identification verification of the target recipient at an access point at the location, and
    identifying a device at the location at the particular time as the second device;
  providing, by the computing system to the second device, a visual representation of the audio message and the associated physical location for display;
  abstaining from providing, by the computing system, the visual representation of the audio message to a third device within a proximity to the physical location but not associated with the target recipient; and
  determining, by the computing system, a priority of the audio message relative to an additional audio message that is associated with the physical location and the target recipient, wherein the providing the visual representation of the audio message to the second device is further based on the priority and the determining the priority comprises assigning the audio message with a higher priority than the additional audio message based on the target recipient of the audio message being indicated by an identifier specific to the target recipient and the target recipient of the additional audio message being indicated by a role of the target recipient.

12. The method of claim 11, wherein the identifying the target recipient comprises identifying, based on natural language processing of at least a portion of the audio message, at least one of:
  a specified person who is the target recipient,
  a specified role associated with the target recipient, or
  a specified task associated with the target recipient.

13. The method of claim 11, wherein the providing visual representation of the audio message to the second device based on the proximity comprises providing the visual representation of the audio message to the second device based on determining that the second device is within a predetermined distance from the physical location.

14. A system comprising:
a memory storing instructions; and
a processor communicatively coupled with the memory and configured to execute the instructions to:
receive an audio message generated by a first device;
determine a physical location associated with the audio message;
identify a target recipient of the audio message;
identify a second device associated with the target recipient, the identifying the second device comprising:
identifying a location of the target recipient at a particular time by receiving an identification verification of the target recipient at an access point at the location, and
identifying a device at the location at the particular time as the second device;
provide, based on a proximity of the second device to the physical location, the audio message to the second device;
abstain from providing the audio message to a third device within the proximity to the physical location but not associated with the target recipient; and
determine a priority of the audio message relative to an additional audio message that is associated with the physical location and the target recipient, wherein the providing the audio message to the second device is further based on the priority and the determining the priority comprises assigning the audio message with a higher priority than the additional audio message based on the target recipient of the audio message being indicated by an identifier specific to the target recipient and the target recipient of the additional audio message being indicated by a role of the target recipient.

15. The system of claim 14, wherein the processor comprises a processor of a multi-access edge computing ("MEC") server integrated within a provider network.

16. The system of claim 14, wherein the first and second devices each comprise a network-enabled headset.

17. The system of claim 14, wherein the providing the audio message to the second device based on the proximity comprises providing the audio message to the second device based on determining that the second device is within a predetermined distance from the physical location.

18. The system of claim 14, wherein:
the target recipient comprises any operative having a specified role; and
the providing the audio message to the second device based on the proximity comprises determining that the second device is a closest device associated with the target recipient to the physical location.

19. The system of claim 14, wherein the identifier specific to the target recipient comprises an identifier unique to the target recipient.

* * * * *